Patented Jan. 12, 1943

2,307,742

UNITED STATES PATENT OFFICE 2,307,742

ACROLEIN-UREA CONDENSATION PRODUCTS AND PROCESS OF PRODUCING SAME

Karl M. Herstein, New York, N. Y., assignor to Acrolein Corporation, a corporation of Delaware No Drawing. Application April 5, 1940, Serial No. 328,029

11 Claims. (Cl. 260—68)

This invention relates to new condensation products produced from acrolein and urea. The invention includes not only new acrolein-urea condensation products and new molded products made therefrom, but also the process by which the new condensation products are produced.

The new acrolein-urea condensation products are white, opaque solids. They are thermoplastic in nature and may be advantageously molded with or without fillers or coloring matter into products of any desirable shape. The molded products, in the absence of added coloring materials, are clear, transparent, amber-colored solids of excellent water resistant properties. By the use of suitable plasticizers molded products of very desirable toughness and mechanical strength may be produced. The new acrolein-urea condensation products may also be mixed with other natural or synthetic resinous materials to produce composite molded plastics.

In producing the new acrolein-urea condensation products by the new process of the invention, acrolein is caused to react with urea in three stages under conditions such that the first stage is acid, the second is alkaline, and the third is again acid. Thus in practicing the new process, acrolein is caused to react with urea in an acid medium, the resulting reaction mixture then being made alkaline and caused to react with an additional quantity of acrolein, and the resulting reaction mixture then being made acid and caused to react with a further quantity of acrolein to produce the new condensation products of the invention.

In carrying out the new process the acidity, during the first and third stages of the condensation, is advantageously such that the pH value is less than about 5. Any suitable acid may be used to produce such acidity, for example, hydrochloric acid, phosphoric acid, sulphuric acid, nitric acid, benzoic acid, etc., may be used with advantage. The acid used in the first stage of the condensation need not be the same as the acid used in the third stage.

During the second, or alkaline, stage of the condensation the pH value is advantageously more than about 8. In general, too high a degree of alkalinity is not desirable since the condensation reaction becomes difficult to control under such conditions. The alkaline material used in the second stage of the condensation may be an organic or an inorganic base, or a salt having a basic reaction. Among such materials which may be used with advantage are potassium or sodium hydroxide, piperidine, triphenyl ammonium hydroxide, trimethyl phenyl ammonium hydroxide, methyl and ethyl amines, ethylene diamine, diethylene triamine, etc.

The proportions of acrolein and urea used in producing the new products may be varied, depending somewhat upon the type of final condensation product desired. In general, an increase in the proportion of acrolein to urea results in the production of harder condensation products having increased water resistance. The total amount of acrolein reacted with urea in producing the new condensation products may advantageously be as little as about two parts by weight of acrolein for each part by weight of urea, and it may be as high as about four parts, or somewhat more, of acrolein for each part of urea.

The amount of acrolein reacted with urea during the various stages of the process is advantageously so proportioned that the reaction product produced in the first or initial acid stage is capable of reacting with a further quantity of acrolein in the second or alkaline stage, the amount of acrolein added during the second stage being such that the reaction product of the second stage is capable of reacting with a further quantity of acrolein during the final acid stage. The amount of acrolein added in the first stage of the condensation is advantageously about one-half the weight of the urea. In the second or alkaline stage the amount of acrolein added is advantageously at least about equal to the weight of urea used in the first stage, although the amount of acrolein may advantageously be considerably more. In the third stage, that is the final acid stage, the amount of acrolein added may be as little as about one-half the weight of the urea used in the first stage, but it may advantageously be considerably more.

The acrolein reacted with the urea during the various acid and alkaline stages of the process may be added in small increments during the several stages. The alkaline or acid materials used to change the pH of the reaction mixtures may be similarly added. Thus, for example, it is advantageous in practicing the alkaline stage of the process to alkalinize the reaction mixture produced in the first stage and then add a regulated amount of acrolein thereto, the resulting reaction mixture being then treated with a further quantity of an alkaline material and an additional amount of acrolein. The acid stages of the process may be practiced in the same manner.

In order to promote the homogeneity of the reaction mixtures it is advantageous to incorporate therein a suitable quantity of an alcohol such, for example, as methanol, ethanol, isopropanol, etc. The amount of alcohol used may be varied but in general a sufficient quantity should be used to bring about the desired homogeneity of the reaction mixture.

The invention will be further described by reference to the following example, it being understood that the invention is not intended to be limited thereto:

About 100 grams of urea are dissolved in a solution containing about 150 cc. of water, about 150 cc. of ethyl alcohol and about 5 cc. of 1% hydrochloric acid. About 50 cc. of acrolein are added to this solution whereupon a reaction commences. The reaction is exothermic in nature and the temperature rises to approximately 50° C. At the end of about fifteen minutes the reaction is substantially complete and the reaction product is a clear, viscous solution.

To this reaction product is added about 10 cc. of a 5% solution of piperidine. About 150 cc. of acrolein are then added, causing a further reaction to take place. Again the reaction is exothermic in nature and the temperature rises to about 60° or 70° C. When the reaction is substantially complete the temperature begins to fall and the odor of acrolein also disappears. The reaction product is a turbid, quite viscous solution.

5 cc. more of the 5% piperidine solution are then added to the reaction mixture together with 100 cc. more of acrolein. A further reaction ensues and the reaction product is a turbid, viscous liquid.

About 10 cc. of an 8% phosphoric acid solution are added to the reaction product, and thereafter about 200 cc. of acrolein are also added. The reaction mixture becomes clear and without giving off any appreciable quantities of heat sets to a clear, transparent, colorless gel in about three or four hours. After standing about ten or twelve hours the gel is transformed into a white, opaque, brittle solid.

In order to use this reaction product for the production of molded articles, it is broken up and dried at about 65° C. The dried condensation product is then advantageously molded by subjecting it to about 5,000 lbs. pressure at a temperature of about 250° F. for about five minutes. The molded product is a hard, tough, amber-colored material of excellent water resistance. Exposing a sample of the product to boiling water for one-half hour does not cause any appreciable softening of the product.

In producing molded articles from the new acrolein-urea condensation products, various coloring materials may be introduced into the reaction mixture during the acid or alkaline stage of the process, or if desired the coloring materials may be admixed with the condensation product just prior to the molding operation. Fillers may also be mixed with the acrolein-urea condensation product.

The new acrolein-urea compositions may be plasticized with any suitable material. Among materials which may advantageously be used for this purpose are acetanilide, benzaldehyde, methyl isobutyl ketone, etc. About 5% by weight of acetanilide may be used with particular advantage. Glycols may also be used, but they tend to decrease the water resistance of the products.

I claim:

1. The process of producing condensation products from acrolein and urea which comprises causing acrolein and urea to react in an acid medium, thereafter rendering the resulting reaction mixture alkaline and causing it to react with a further quantity of acrolein, thereafter rendering the resulting reaction mixture acid and causing it to react with an additional quantity of acrolein.

2. The process of producing condensation products from acrolein and urea which comprises causing acrolein and urea to react in an acid medium, thereafter rendering the resulting reaction mixture alkaline and causing it to react with a further quantity of acrolein, thereafter further alkalinizing the resulting reaction mixture and causing it to react with a further quantity of acrolein, thereafter rendering the resulting reaction mixture acid and causing it to react with an additional quantity of acrolein.

3. The process of producing condensation products from acrolein and urea which comprises causing acrolein to react with urea in a medium having a pH less than about 5, therafter adjusting the pH of the resulting reaction mixture so that it is more than about 8 and causing the reaction mixture to react with a further quantity of acrolein, thereafter adjusting the pH of the resulting reaction mixture so that it is less than about 5 and causing the reaction mixture to react with an additional quantity of acrolein.

4. The process of producing condensation products from acrolein and urea which comprises causing about one part by weight of urea to react with about one-half part by weight of acrolein in an acid medium, thereafter rendering the resulting reaction mixture alkaline and causing it to react with at least about one part by weight of acrolein, thereafter rendering the resulting reaction mixture acid and causing it to react with at least about one-half part by weight of acrolein.

5. The process of producing condensation products from acrolein and urea which comprises causing about one part by weight of urea to react with about one-half part by weight of acrolein in a medium having a pH less than about 5, thereafter adjusting the pH of the resulting reaction mixture so that it is more than about 8 and causing said reaction mixture to react with at least about one part by weight of acrolein, thereafter adjusting the pH of the resulting reaction product so that it is less than about 5 and causing said reaction mixture to react with at least about one-half part by weight of acrolein.

6. Acrolein-urea condensation products produced by the process set forth in claim 1.

7. Acrolein-urea condensation products produced by the process set forth in claim 2.

8. Acrolein-urea condensation products produced by the process set forth in claim 3.

9. Molded acrolein-urea condensation products produced from the products made by the process set forth in claim 1.

10. Molded acrolein-urea condensation products produced from the products made by the process set forth in claim 2.

11. Molded acrolein-urea condensation products produced from the products made by the process set forth in claim 3.

KARL M. HERSTEIN.